(12) United States Patent
Thakur

(10) Patent No.: US 10,120,381 B2
(45) Date of Patent: Nov. 6, 2018

(54) IDENTIFYING SIGNIFICANT LOCATIONS BASED ON VEHICLE PROBE DATA

(71) Applicant: NISSAN NORTH AMERICA, INC., Franklin, TN (US)

(72) Inventor: Siddharth Thakur, Milpitas, CA (US)

(73) Assignee: Nissan North America, Inc., Franklin, TN (US)

( * ) Notice: Subject to any disclaimer, the term of this patent is extended or adjusted under 35 U.S.C. 154(b) by 294 days.

(21) Appl. No.: 14/976,405

(22) Filed: Dec. 21, 2015

(65) Prior Publication Data

US 2016/0265930 A1    Sep. 15, 2016

Related U.S. Application Data

(63) Continuation-in-part of application No. 14/657,127, filed on Mar. 13, 2015, now Pat. No. 9,778,658.

(51) Int. Cl.
*G05D 1/00* (2006.01)
*G01C 21/32* (2006.01)
*G01C 21/36* (2006.01)

(52) U.S. Cl.
CPC .......... *G05D 1/0088* (2013.01); *G01C 21/32* (2013.01); *G01C 21/3617* (2013.01); *G05D 2201/0213* (2013.01)

(58) Field of Classification Search
CPC ......... G05D 1/0088; G05D 2201/0213; G01C 21/32; G01C 21/3617
See application file for complete search history.

(56) References Cited

U.S. PATENT DOCUMENTS

| 4,656,950 | A | 4/1987 | Rhoton |
|---|---|---|---|
| 8,452,771 | B2 | 5/2013 | Kurciska et al. |
| 8,655,588 | B2 | 2/2014 | Wong et al. |
| 8,694,232 | B2 | 4/2014 | Kono et al. |
| 8,896,685 | B2 | 11/2014 | Ihara et al. |

(Continued)

FOREIGN PATENT DOCUMENTS

| EP | 2568310 A2 | 3/2013 |
|---|---|---|
| JP | 2013-182551 A | 9/2013 |
| WO | 2013-169182 A1 | 11/2013 |

*Primary Examiner* — Thomas G Black
*Assistant Examiner* — Sze-Hon Kong
(74) *Attorney, Agent, or Firm* — Young Basile Hanlon & MacFarlane, P.C.

(57) ABSTRACT

A method, a vehicle and a system that identify and use a location significant to a person associated with a vehicle based on vehicle probe data are described. Vehicle transportation network information representing a vehicle transportation network is identified, the vehicle transportation network information including destinations of a vehicle obtained from vehicle probe data. For at least some of the destinations, density-based clustering is performed using temporal data associated with the at least some of the destinations to form at least two spatio-temporal clusters. A contextual label is assigned to a location associated with a first spatio-temporal cluster of the at least two spatial-temporal clusters based on the temporal data associated with the first spatio-temporal cluster, the location being a labeled location, and the labeled location is used for vehicle operation. The labeled location may be used for navigation or service, for example.

20 Claims, 10 Drawing Sheets

(56) References Cited

U.S. PATENT DOCUMENTS

| | | | |
|---|---|---|---|
| 9,037,485 B2 * | 5/2015 | Fu | H04L 51/04 705/14.66 |
| 9,574,894 B1 * | 2/2017 | Karakotsios | G01C 21/3617 |
| 9,959,508 B2 * | 5/2018 | Brown | G06N 99/005 |
| 2005/0073443 A1 * | 4/2005 | Sheha | G01C 21/36 340/995.1 |
| 2005/0125148 A1 * | 6/2005 | Van Buer | G01C 21/3617 701/468 |
| 2005/0228553 A1 * | 10/2005 | Tryon | B60K 6/46 701/22 |
| 2006/0184013 A1 | 8/2006 | Emanuel et al. | |
| 2007/0276596 A1 * | 11/2007 | Solomon | G01C 21/3632 701/431 |
| 2010/0256908 A1 | 10/2010 | Shimshoni et al. | |
| 2011/0071881 A1 * | 3/2011 | Zheng | G06Q 30/02 705/7.34 |
| 2011/0208425 A1 * | 8/2011 | Zheng | G01S 19/14 701/532 |
| 2012/0136865 A1 * | 5/2012 | Blom | G06F 17/30141 707/739 |
| 2013/0060461 A1 | 3/2013 | Wong et al. | |
| 2013/0158742 A1 * | 6/2013 | Cooper | B61L 27/0027 701/2 |
| 2013/0211699 A1 | 8/2013 | Scharmann et al. | |
| 2013/0211705 A1 | 8/2013 | Geelan et al. | |
| 2013/0238241 A1 * | 9/2013 | Chelotti | G01C 21/3617 701/533 |
| 2013/0295956 A1 * | 11/2013 | Ding | H04W 4/025 455/456.1 |
| 2014/0058634 A1 | 2/2014 | Wong et al. | |
| 2014/0059695 A1 * | 2/2014 | Parecki | G06F 21/60 726/26 |
| 2014/0285361 A1 | 9/2014 | Tippelhofer et al. | |
| 2014/0320318 A1 | 10/2014 | Victor et al. | |
| 2014/0350853 A1 | 11/2014 | Proux | |
| 2015/0106010 A1 | 4/2015 | Martin et al. | |
| 2015/0134180 A1 * | 5/2015 | An | G01C 21/34 701/23 |
| 2015/0141043 A1 | 5/2015 | Abramson et al. | |
| 2015/0294223 A1 * | 10/2015 | Brown | G06N 99/005 706/46 |
| 2015/0348335 A1 * | 12/2015 | Ramanujam | G07C 5/006 701/23 |
| 2016/0061607 A1 * | 3/2016 | Yang | G01C 21/32 701/468 |
| 2016/0125673 A1 * | 5/2016 | Bromham | G01C 21/26 701/115 |
| 2017/0017928 A1 * | 1/2017 | Miller | G06Q 10/10 |
| 2017/0099582 A1 * | 4/2017 | Boesen | H04W 4/028 |
| 2017/0103571 A1 * | 4/2017 | Beaurepaire | G01C 21/3667 |
| 2017/0123434 A1 * | 5/2017 | Urano | B60Q 9/008 |
| 2017/0174215 A1 * | 6/2017 | Tseng | B60W 10/20 |
| 2017/0193627 A1 * | 7/2017 | Urmson | G01C 21/3617 |
| 2017/0299402 A1 * | 10/2017 | Hansen | G01C 21/3682 |
| 2017/0308908 A1 * | 10/2017 | Weiss | G06Q 30/02 |
| 2018/0017405 A1 * | 1/2018 | Chen | G06Q 50/30 |
| 2018/0107981 A1 * | 4/2018 | Lazarus | G06Q 10/109 |

* cited by examiner ated with the first spatio-temporal cluster of the at least two spatial-temporal clusters based on the temporal data associated with the first spatio-temporal cluster, the location being a labeled location, and use the labeled location for vehicle operation.

IDENTIFYING SIGNIFICANT LOCATIONS BASED ON VEHICLE PROBE DATA

CROSS-REFERENCE TO RELATED APPLICATION

This application is a continuation-in-part of U.S. application Ser. No. 14/657,127, filed on Mar. 13, 2015, the entire content of which is incorporated herein in its entirety by reference.

TECHNICAL FIELD

This disclosure relates to vehicle operations using locations identified as significant to a person associated with the vehicle.

BACKGROUND

A vehicle may include a control system that generates and maintains the route of travel and controls the vehicle to traverse the route of travel. When the vehicle is an autonomous vehicle, it may be controlled without direct human intervention to traverse a route of travel from an origin to a destination. Often the origin and destination, and thus the route of travel, is defined by locations significant to a person associated with the vehicle.

SUMMARY

Disclosed herein are aspects, features, elements, implementations and embodiments of identifying significant locations using vehicle probe data, e.g., data related to the operation of a vehicle. In this way, for example, changes in one or more locations significant to a person associated with the vehicle (e.g., an owner, user, or driver) may be identified.

According to an aspect of the disclosed embodiments, a vehicle includes a processor that is configured to execute instructions stored on a non-transitory computer readable medium to identify vehicle transportation network information representing a vehicle transportation network, the vehicle transportation network information including destinations of a vehicle obtained from vehicle probe data, for at least some of the destinations, perform density-based clustering using temporal data associated with the at least some of the destinations to form at least two spatio-temporal clusters, and assign a contextual label to a location associated with a first spatio-temporal cluster of the at least two spatial-temporal clusters based on the temporal data associated with the first spatio-temporal cluster, the location being a labeled location. The vehicle also includes a vehicle operation device configured to operate the vehicle using the labeled location.

Another aspect of the disclosed embodiments is a system for identifying and using a location significant to a person associated with a vehicle based on vehicle probe data. The system includes a memory including a non-transitory computer readable medium, and a processor. The processor is configured to execute instructions stored on the non-transitory computer readable medium to identify vehicle transportation network information representing a vehicle transportation network, the vehicle transportation network information including destinations of a vehicle obtained from vehicle probe data, for at least some of the destinations, perform density-based clustering using temporal data associated with the at least some of the destinations to form at least two spatio-temporal clusters, assign a contextual label to a location associated with a first spatio-temporal cluster of the at least two spatial-temporal clusters based on the temporal data associated with the first spatio-temporal cluster, the location being a labeled location, and use the labeled location for vehicle operation.

Another system described herein includes a memory including a non-transitory computer readable medium, and a processor configured to execute instructions stored on the non-transitory computer readable medium to identify vehicle transportation network information representing a vehicle transportation network by performing spatial clustering of vehicle location information obtained from vehicle probe data of a vehicle, the vehicle transportation network information including destinations of the vehicle, perform two-dimensional density-based clustering using an arrival time of day and a stay time associated with at least some of the destinations to form a spatio-temporal cluster, assign a contextual label to a location associated with the spatio-temporal cluster based on temporal data associated with the spatio-temporal cluster, the location being a labeled location, and use the labeled location for vehicle operation.

Variations in these and other aspects, features, elements, implementations and embodiments of the methods, apparatus, procedures and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements in the various views.

DETAILED DESCRIPTION

Figure 1:
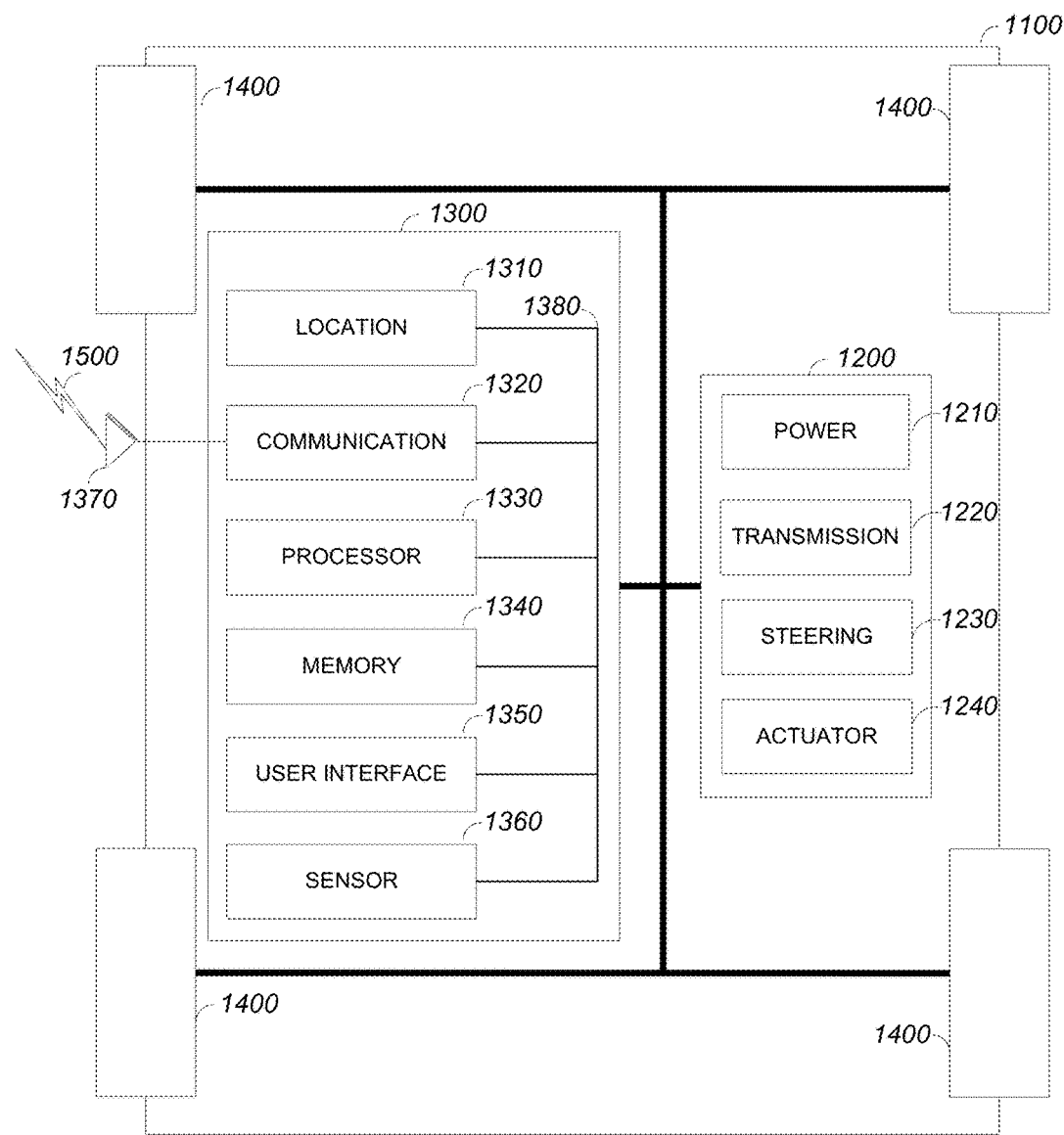
FIG. 1 is a diagram of an example of a portion of a vehicle in which the aspects, features and elements disclosed herein may be implemented.

A vehicle may travel from a point of origin to a destination in a vehicle transportation network. In doing so, a controller within the vehicle may generate a route of travel from the origin to the destination based on vehicle information, environment information, vehicle transportation network information representing the vehicle transportation network, or a combination thereof. The vehicle may also receive this information from a remote computing source. The vehicle then traverses the generated route. An autonomous vehicle, for example, traverses the generated route, e.g., without human intervention.

The vehicle transportation network information may rely upon aggregated data from the vehicle. For example, location related meta-data may be aggregated based on such attributes as most visited location (e.g., by number of visits or length of visits) to infer a location context, such as home or work. Then, that inferred location may be used to provide telematics and/or other services to the vehicle and/or its owner or operator. Using basic attributes alone to select locations for aggregation is not particularly accurate.

According to the teachings herein, spatio-temporal clustering can be used to separate regular repeating patterns or habits from vehicle probe data. More specifically, spatial clustering can be applied to vehicle probe data to identify locations and subsequently, two-dimensional density-based clustering may be applied to time parameters to identify repeating patterns or habits. The clusters are used to infer location context with the use of aggregating characteristics. In addition to time-related parameters, other meta-data from a vehicle such as fuel usage, battery level, etc., can be used for further clustering. Once the locations significant to an owner or operator are identified, they can be used in operation of the vehicle. For example, the vehicle transportation network information personalized with the locations may be used to generate travel routes or to identify sources of services, such as service locations, etc. Further, it can be used to identify changes in locations associated with the owner or operator. This further assists operation of the vehicle in that, for example, owners/operators that have moved a location, e.g., a home location, can be more easily found for service contacts by a closer dealer to the new location.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps, operations, or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle 1000 in which the aspects, features, and elements disclosed herein may be implemented. In some embodiments, the vehicle 1000 is an autonomous vehicle. The vehicle 1000 in FIG. 1 includes a chassis 1100, a powertrain 1200, a controller 1300, and wheels 1400, and can include any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 includes include a power source 1210, a transmission 1220, a steering unit 1230, and an actuator 1240. The powertrain 1200 may also include any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, so as to provide kinetic energy as a motive force to one or more of the wheels 1400. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. Similarly, the steering unit 1230 may be controlled by the controller 1300, the actuator 1240, or both, and in turn controls the wheels 1400 to steer the vehicle 1000. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit in FIG. 1, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 includes one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 is operatively coupled with the location unit 1310, the memory 1340, the electronic communication interface 1370, the electronic communication unit 1320, the user interface 1350, the sensor 1360, and/or the powertrain 1200. For example, the processor may be operatively coupled with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 includes an audio interface for performing audio communication with a person and/or a touch display for performing visual and touch-based communication with the person.

The sensor 1360 often includes one or more sensors 1360, such as an array of sensors, which are operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
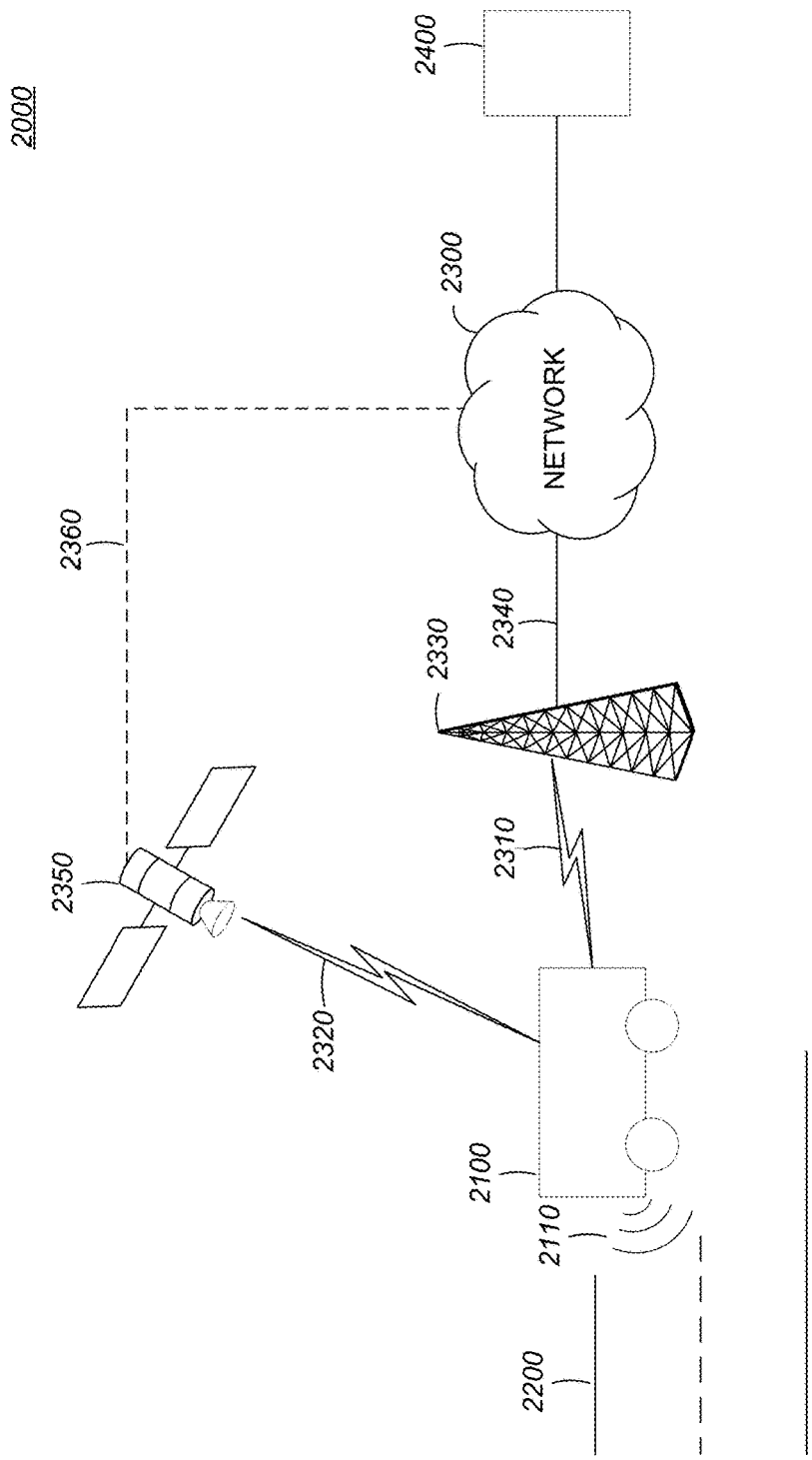
FIG. 2 is a diagram of an example of a portion of a vehicle transportation and communication system in which the aspects, features and elements disclosed herein may be implemented.

FIG. 2 is a diagram of an example of a portion of a vehicle transportation and communication system in which the aspects, features and elements disclosed herein may be implemented. The vehicle transportation and communication system 2000 may include one or more vehicles 2100, which may travel via one or more portions of one or more vehicle transportation networks 2200, and may communicate via one or more electronic communication networks 2300. Each vehicle 2100 may be a vehicle 1000 similar to that shown in FIG. 1, and at least some vehicles may be autonomous vehicles. Although not explicitly shown in FIG. 2, an vehicle may traverse an area that is not expressly or completely included in a vehicle transportation network, such as an off-road area.

The electronic communication network 2300 may be, for example, a multiple access system that provides for communication, such as voice communication, data communication, video communication, messaging communication, or a combination thereof, between the vehicle 2100 and one or more communicating devices 2400. For example, a vehicle 2100 may receive information, such as information representing the vehicle transportation network 2200, from a communicating device 2400 via the network 2300.

In some embodiments, a vehicle 2100 may communicate via a wired communication link (not shown), a wireless communication link 2310/2320, or a combination of any number of wired or wireless communication links. For example, as shown, a vehicle 2100 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

The autonomous vehicle 2100 may communicate with the communications network 2300 via an access point 2330 as shown in FIG. 2. The access point 2330, which may include a computing device, is configured to communicate with a vehicle 2100, with a communication network 2300, with one or more communicating devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, the access point 2330 may include any number of interconnected elements.

Alternatively or additionally, the autonomous vehicle 2100 may communicate with the communications network 2300 via a satellite 2350, or other non-terrestrial communication device. The satellite 2350, which may include a computing device, is configured to communicate with an autonomous vehicle 2100, with a communication network 2300, with one or more communicating devices 2400, or with a combination thereof via one or more communication links 2320/2360. Although shown as a single unit, the satellite 2350 may include any number of interconnected elements.

An electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network

2200. For example, the autonomous vehicle 200 includes one or more on-vehicle sensors 2110, such as sensor(s) 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may further traverse a portion or portions of one or more vehicle transportation networks 2200 using information communicated via the network 2300, such as information representing the vehicle transportation network 2200, information identified by one or more on-vehicle sensors 2110, or a combination thereof.

Although for simplicity FIG. 2 shows one vehicle 2100, one vehicle transportation network 2200, one electronic communication network 2300, and one communicating device 2400, any number of vehicles, networks, or computing devices may be used. In some embodiments, the vehicle transportation and communication system 2000 may include devices, units or elements not shown in FIG. 2. Although the vehicle 2100 is shown as a single unit, the vehicle 2100 may include any number of interconnected elements.

Figure 3:
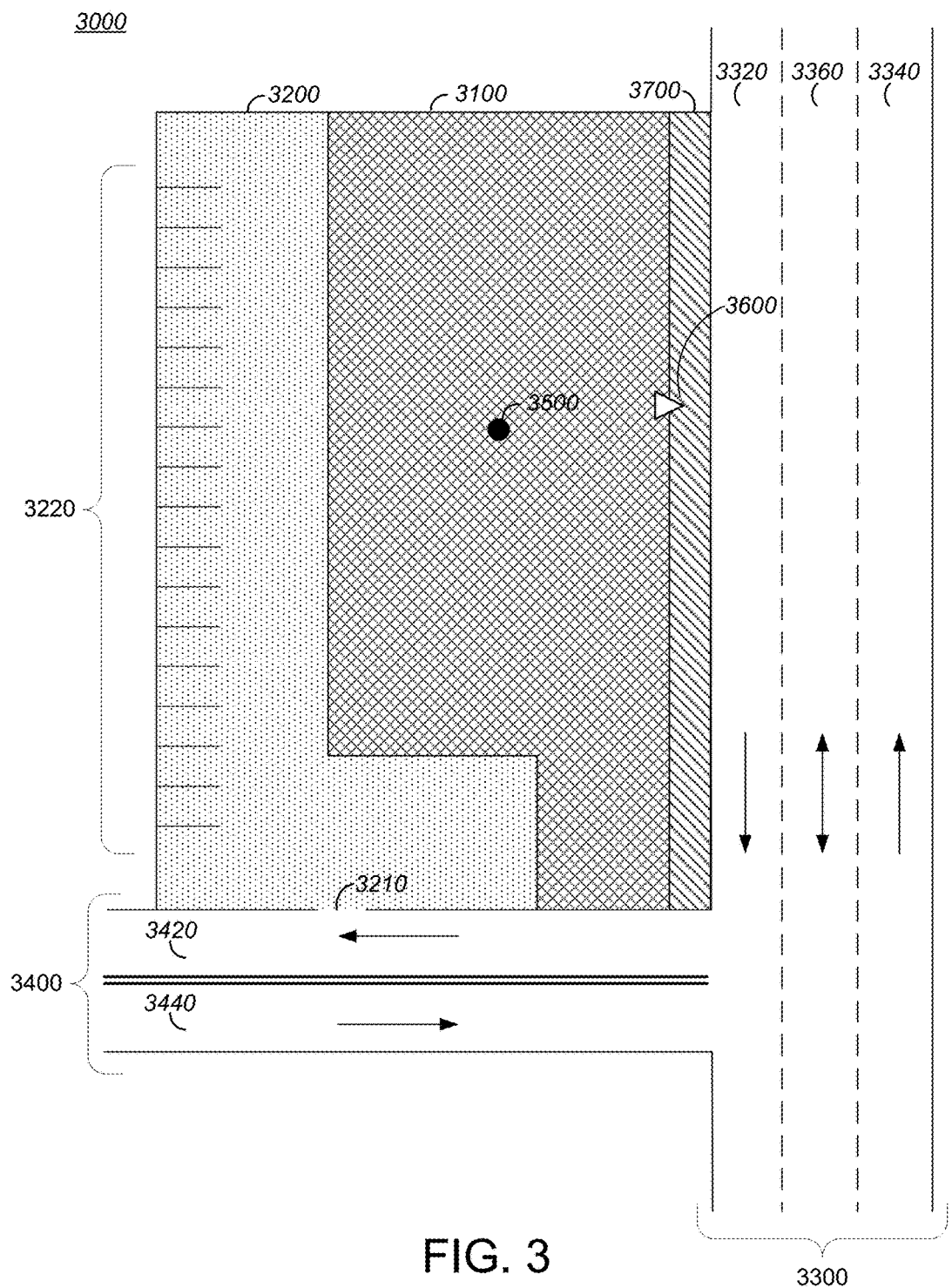
FIG. 3 is a diagram of a portion of a vehicle transportation network in accordance with this disclosure.

FIG. 3 is a diagram of a portion of a vehicle transportation network 3000 in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1 or the vehicle 2100 shown in FIG. 2, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400 may include one or more lanes 3320/3340/3360/3420/3440, and may be associated with one or more directions of travel, which are indicated by arrows in FIG. 3.

A vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which are stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. The vehicle transportation network information may further include vehicle transportation network control information, such as direction of travel information, speed limit information, toll information, grade information, such as inclination or angle information, surface material information, aesthetic information, or a combination thereof.

A portion, or a combination of portions, of the vehicle transportation network may be identified as a point of interest, a significant location, or a destination as described in additional detail hereinafter. For example, the vehicle transportation network information may identify the building 3100 as a point of interest, a vehicle may identify the point of interest as a destination, and the vehicle may travel from an origin to the destination by traversing the vehicle transportation network.

Identifying a destination may include identifying a location for the destination, which may be a discrete uniquely identifiable geolocation, such as the geographic location 3500 for the building 3100. For example, the vehicle transportation network may include a defined location, such as a street address, a postal address, a vehicle transportation network address, a longitude and latitude, or a GPS address, for the destination.

A destination may be associated with one or more entrances, such as the entrance 3600 shown in FIG. 3. In some embodiments, the vehicle transportation network information may include defined or predicted entrance location information, such as information identifying a geolocation of an entrance associated with a destination.

The vehicle transportation network may be associated with, or may include, a pedestrian transportation network. For example, FIG. 3 includes a portion 3700 of a pedestrian transportation network, which may be a pedestrian walkway. In some embodiments, a pedestrian transportation network, or a portion thereof, such as the portion 3700 of the pedestrian transportation network shown in FIG. 3, is represented as pedestrian transportation network information. In some embodiments, the vehicle transportation network information may include pedestrian transportation network information. A pedestrian transportation network includes pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

Figure 4:
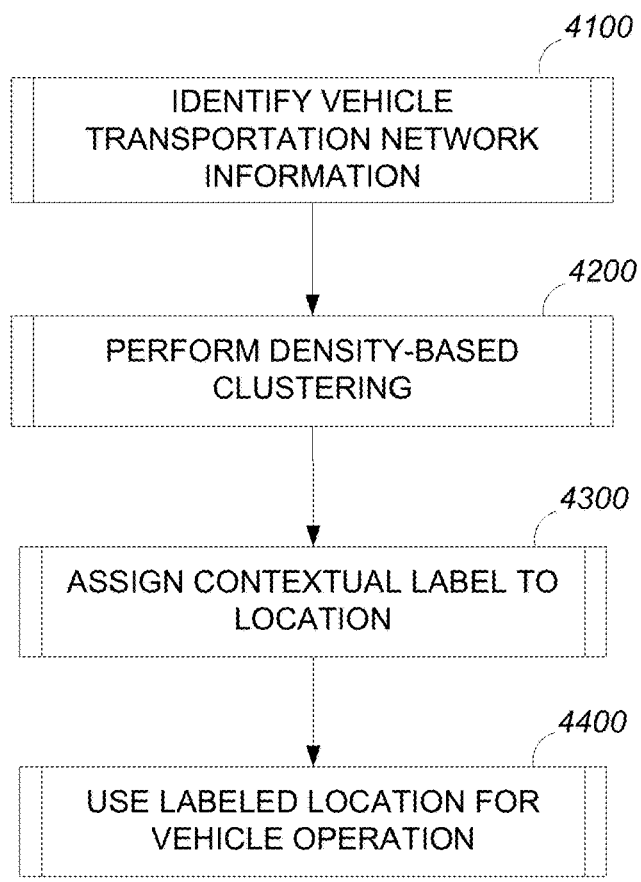
FIG. 4 is a flow chart diagram of a method of identifying significant locations using probe data where the locations can be used for vehicle operations.

FIG. 4 is a flow chart diagram of a method 4000 of identifying significant locations using probe data where the locations can be used for vehicle operations. Identifying significant locations may be implemented in a vehicle, such as the vehicle 1000 shown in FIG. 1 or the vehicle 2100 shown in FIG. 2. For example, the processor 1330 of the controller 1300 of the vehicle 1000 shown in FIG. 1 may execute instructions stored on the memory 1340 of the controller 1300 of the vehicle 1000 shown in FIG. 1 to identify significant locations using probe data. In some implementations, some or all of the operations of the method 4000 may be performed remotely of the vehicle.

As shown in FIG. 4, identifying significant locations includes identifying vehicle transportation network information at 4100, performing density-based clustering at 4200, assigning a contextual label to a location at 4300, and using the labeled location for vehicle operation at 4400.

Identifying vehicle transportation network information at 4100 can be performed by, for example, a control unit such as the controller 1300 shown in FIG. 1 reading the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, identifying the vehicle transportation network information includes transcoding or reformatting the vehicle transportation network information, storing the reformatted vehicle transportation network information, or both.

In some embodiments, the vehicle transportation network has a portion, such as the geographic location 3500 and/or another destination or location, associated with the vehicle and hence with a person associated with the vehicle. Thus, the vehicle transportation network information includes destinations of the vehicle obtained from vehicle probe data.

Figure 5:
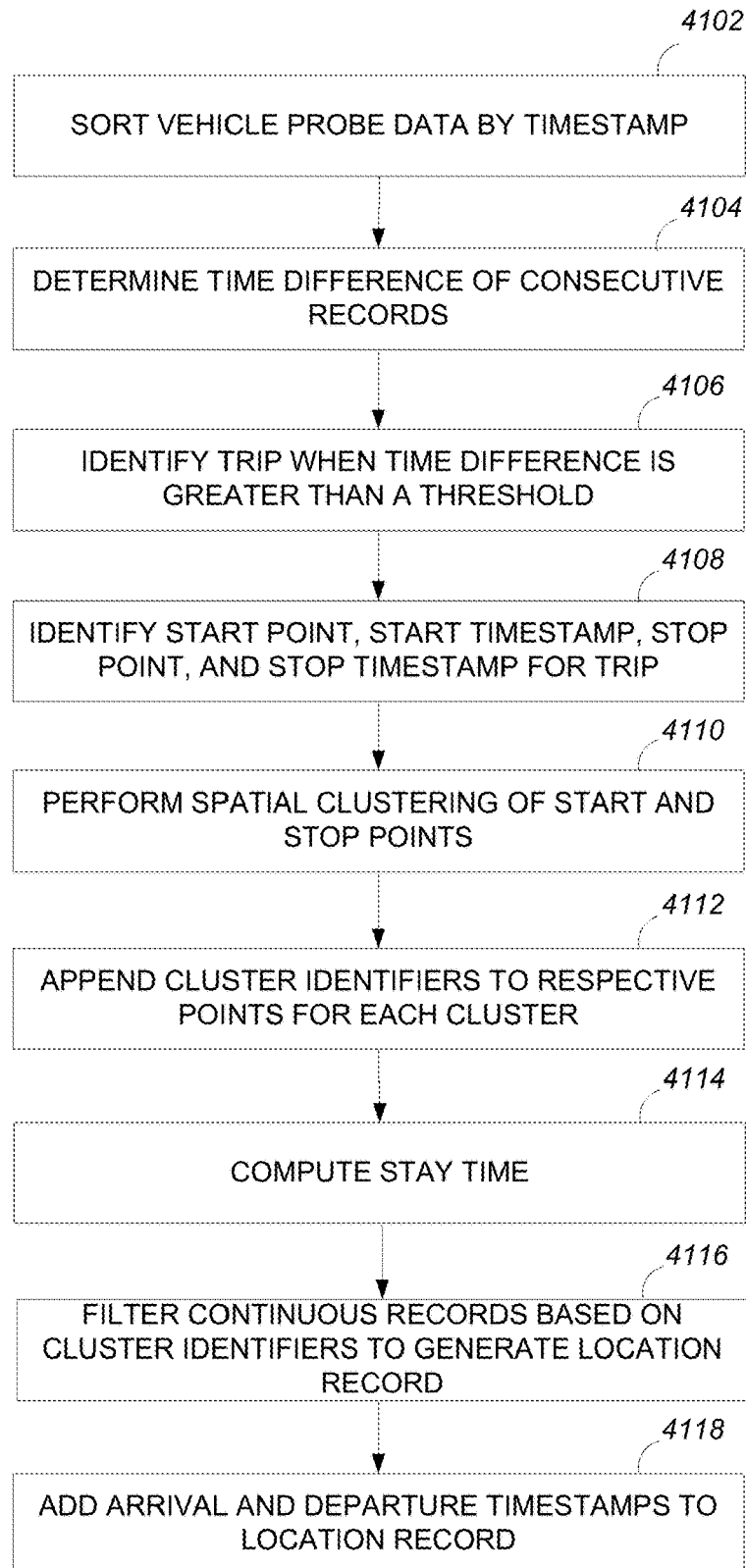
FIG. 5 is a flow chart diagram of identifying destinations of the vehicle transportation network information in accordance with one implementation of the method of FIG. 4.

FIG. 5 is a flow chart diagram of identifying destinations of the vehicle transportation network information in accordance with one implementation of the method 4000 of FIG. 4. Identifying destinations of the vehicle transportation network information can include some or all of the operations of FIG. 5. That is, identifying destinations of the vehicle transportation network information uses vehicle probe data. The operations of FIG. 5 generate destinations assuming certain types of vehicle probe data are collected. Namely, FIG. 5 assumes that the vehicle probe data collected is a simple log of vehicle position and usage at intervals that can be processed through several steps of transformation and processing to be converted into trip data, e.g., start and stop points with start and stop timestamps as discussed. Different operations may be involved with identifying destinations when different vehicle probe data are available. For example, when various trip data are available directly, the processing of FIG. 5 can begin with spatial clustering. Other variations of the processing of FIG. 5 are possible.

Vehicle probe data is sorted by timestamp at 4102. Vehicle probe data can be collected from vehicle operating information. The vehicle operating information may include operating information generated for a vehicle, and may include vehicle location information, vehicle status information, vehicle event information, vehicle bus data, such as controller area network (CAN) data, or any other information generated based on vehicle operation.

The vehicle operating information may include information reported by a vehicle, or an operational unit thereof, such as a data logging unit, a telematics control unit, a telemetry unit, a probe unit, an operational recorder, or any other unit or combination of units capable of detecting, storing or reporting an operation, or an operating condition, of a vehicle, such as a power-up operation, a start operation, a running operating condition, a stop operation, a power-down operation, a door opening operation, a door open operating condition, a door closing operation, a door closed operating condition, a door lock operation, a door locked operating condition, a door unlock operation, a door unlock operating condition, or any other operation or operating condition of the vehicle. The vehicle operating information often includes a time, a date, a geographic location, or a combination thereof, for one or more of the operations, or operating conditions. The vehicle operating information may include records where each record may be associated with a unique identifier of the vehicle.

The vehicle operating information may include event indicators that include a type of vehicle operation or an event, such as start, stop, stand, park, door open, door close, load or unload. A vehicle operation may include a date, a time, or both. A vehicle operation may indicate a location, such as a GPS location within the vehicle transportation network. For example, the vehicle operating information may indicate a vehicle operation including a stationary period, such as a period or duration between a vehicle stop event and a subsequent vehicle start event.

In some embodiments, the vehicle operating information may include passenger information, such as a passenger identifier. It may also include other information that is likely to be unique to a passenger, owner or operator such as wireless (e.g., Bluetooth or Wifi) device media access control (MAC) address and/or device name. Seat adjustment settings may also encompassed within the vehicle operating information. Vehicle operating information may also include fuel usage or levels, battery level, etc., at various times.

The vehicle operating information may be supplemented by other information associated with infrastructure devices in response to detecting a respective vehicle. For example, an infrastructure device may be a smart parking meter, a traffic camera, a building access device, or any other non-vehicle device associated with the transportation network information and capable of detecting, or being detected by, the vehicle. This supplementary information may include location information identifying a location of the infrastructure device in the vehicle transportation network, a time, a date or both associated with the vehicle detecting or being detected by the infrastructure device, or a time, a date or both associated with the vehicle no longer being detected by or no longer detecting the infrastructure device.

As can be seen, the vehicle operating information may be obtained through various sources and may be obtained at regular or varying intervals. Vehicle probe data are extracted from the vehicle operating information and sorted by timestamp. The vehicle probe data include the timestamps and geographical location, such as GPS coordinates. The vehicle probe data can also include a state of the vehicle at the measurement time for each point of data collection, such as whether the vehicle was moving or was stationary. Extraction of other vehicle probe data is also possible.

Sorting the vehicle probe data by timestamp at 4102 is the start of transforming point data to trip data within FIG. 5. Once the vehicle probe data is sorted by the measurement timestamp to form a sequence of records, the remaining operations of transforming point data to trip data, namely calculating a time difference of consecutive records at 4104, identifying a trip when the time difference exceeds a threshold value at 4106, and identifying the start point, start timestamp, stop point, and stop timestamp for the trip at 4108, can be performed. This process results in a number of trips that depends on the threshold value and the period over which the data is analyzed.

For example, calculating a time difference of consecutive records at 4104 may begin with identifying a first record at the beginning of a defined time period such as one month. Calculating a time difference from the first record can then occur so as to produce an accumulated value as the time difference for comparison with the threshold value. More specifically, a measurement timestamp of a next, current record may be subtracted from that of the first record and the difference compared to the threshold value. If the difference is below (or at) the threshold value, it is stored as a cumulative time difference, and a difference between the measurement timestamps of the current record and the next record is calculated and added to the cumulative time difference. As long as the cumulative time difference does not exceed the threshold value, such processing continues for the records in the sequence. The threshold value may be, for example, 15 minutes, 30 minutes, one hour, etc. Depending upon the threshold value, computing capabilities and the number of samples (i.e., records), some records within the sequence may be omitted from the calculation of the cumulative time difference.

Identifying a trip when the time difference is greater than the threshold value at 4106 can include, according to this description, identifying the trip when the cumulative time difference is greater than the threshold value. A trip is identified by identifying the start of the trip. Initially, the start of the trip is the first record described above. Subsequent trip starts may be the first record in the sequence of records following the last record in the sequence that causes the time difference to exceed the threshold. As can be discerned from this description, multiple trips and hence multiple trip starts result from this process.

In the alternative, if the records are generated at a fixed, defined interval, such that the time difference between consecutive records is the same, the sequential calculations may be omitted. In such a case, the number of records that occur over the threshold periods is consistent over time. Identifying the trip when the time difference exceeds the threshold value at 4106 is then a simple matter of defining each trip start after a constant number of records within the sequence has passed based on the defined interval. For example, each trip would encompass fifteen records of the sequence for a measurement interval of 1 minute and a threshold value of 15 minutes.

Regardless of how the trips are identified, each trip may be assigned a unique label. Then, identifying the start point, the start timestamp, the stop point and the stop timestamp for a trip at 4108 uses the trip data developed at 4106. For each trip label, for example, the start timestamp is known from the process of 4104 and 4106. The start point is the vehicle spatial coordinates from the vehicle probe data associated with the start timestamp. Similarly, the stop timestamp is the last record forming the trip, and the stop point is the vehicle spatial coordinates from the vehicle probe data associated with the stop timestamp. The vehicle spatial coordinates may be stored as GPS coordinates or in another coordinate system. Identifying the start point and the stop point may include converting the vehicle spatial coordinates as stored into a common coordinate system with the other map data of the vehicle transportation network information, such as the infrastructure map data shown in FIG. 3. The trip labels, along with the start and stop points and start and stop timestamps may be written to a database for later use.

After the trip data is identified at 4108 and optionally stored to form stored trip data, performing spatial clustering of the start and stop points for the trips occurs at 4110. Spatial clustering results in unique vehicle transportation network locations and is desirable due to the use of the common coordinate system for calculations. More specifically, the vehicle transportation network information such as that shown in FIG. 3 generally uses a coordinate system such as the Universal Transverse Mercator (UTM) coordinate system for map coordinates, which transforms input points to UTM coordinates in each UTM zone. Vehicle spatial location data is generally produced as GPS coordinates. These GPS coordinates may be transformed UTM coordinates according to known conversion formulas. Other coordinate systems are possible as long as the selected system is used consistently. Regardless of the common coordinate system used, the conversion between coordinate systems generally results in imprecision in the vehicle map coordinates (i.e., its position within the system) relative to the infrastructure map coordinates. For example, the vehicle may be parked in the same parking lot at two measurement points yet have two different sets of vehicle map coordinates.

Thus, performing spatial clustering of start and stop points at 4110 can involve treating the start and stop points as a unique vehicle transportation network location when they fall within a defined area within a map grid. Alternatively, clustering algorithms may be applied to the start and stop points to generate the unique locations. For example, a Delaunay triangulation based spatial clustering technique may be used to identify different locations from a set of points, each location generally encompassing at least one start point and/or at least one stop points and more likely encompassing a large number of such points. One example of using such a technique for clustering vehicle spatial coordinates is found in U.S. patent Ser. No. 14/657,082, filed Mar. 13, 2015, the entire contents of which are incorporated herein by reference.

The spatial clustering at 4110 is the starting operation for transforming the trip data to a location summary. That is, trip data resulting at the end of the identification at 4108 results in start and stop points, but it does not aggregate travel and stay patterns around a location. After the spatial clustering at 4110, the unique locations within the vehicle transportation network that result can be used for this pattern analysis. For example, a cluster identifier to each unique vehicle transportation network location resulting from performing spatial clustering may be identified. The cluster identifier can be a numeric or alphanumeric identifier, for example. The cluster identifier may be further appended to any of the start points and any of the stop points forming a respective one of the spatial clusters within the stored trip data at 4112. Appending the cluster identifier may include writing the cluster identifier to each of the start and stop points within the stored records described with respect to the identification of 4108.

Thereafter, computing stay time at 4114 and filtering continuous records based on cluster identifiers at 4116 may occur. Computing stay time at 4114 may include determining a stay time for a trip of the trip data as a difference between a stop timestamp of the trip and a start timestamp of a subsequent trip in the sequence of trips. Depending on the parameters used for the clustering, many start points and/or stop points may not fall within a cluster. Accordingly, this computing stay time at 4114 may be limited to only those records within the stored trip data having a cluster identifier associated with a start point and/or an end point.

Filtering continuous records by comparing a cluster identifier of the trip with a cluster identifier of the subsequent trip to generate a location record for the unique vehicle transportation network location at 4116 includes comparing the current end cluster identifier to the next start cluster identified to filter records that involve no change in location from one trip to the next. That is, because trips are identified at 4106 based on the passage of time instead of a change in location, the start and stop points of any single trip may or may not be different even though the start and stop timestamps are different. Thus, a subsequent trip may belong to the same cluster or a different cluster from the current trip. When the cluster is the same, subsequent record represents a continuing stay at the location, so the subsequent record can be considered with the current record by, for example, merging the subsequent record with the current record (e.g., filtering the subsequent record) to form a location record. When the subsequent trip within the time sequence (as indicated by the timestamps) has a start point within a different cluster from the end point of the current trip, a new location record for the unique vehicle transportation network location associated with the new cluster identifier is used to form a new location record, filtered as appropriate using the next record. That is, if the next record is in the same cluster, the data may be merged in a single location record. Otherwise, the unique vehicle transportation network location associated with the cluster of the next record, if any, may be used to form a new location record. If the next record does not have any cluster identifier associated with the start point, it may be considered if it has a cluster identifier associated with the end point. This processing continues until all labeled trips are considered that have one or more cluster identifiers.

By this processing, the stored trip data may be transformed into location records for the unique vehicle transportation network locations. This transformation may be completed by adding an arrival timestamp at the unique vehicle transportation network location and a departure timestamp from the unique vehicle transportation network location at 4118. The location records, with timestamps, may be written within the database as a location summary. The destinations of the vehicle obtained from the vehicle probe data, i.e., the unique vehicle transportation network locations, may thus be represented by a number of entries within the location summary.

Referring again to the method 4000 of FIG. 4, the operation at 4118 represents the end of identifying the vehicle transportation network information of 4100 in this implementation. The method 4000 proceeds to perform temporal clustering. More specifically, density-based clustering using temporal data associated with at least some of the destinations is performed to form at least two spatio-temporal clusters at 4200. This processing is explained in more detail with respect to FIG. 6.

Figure 6:
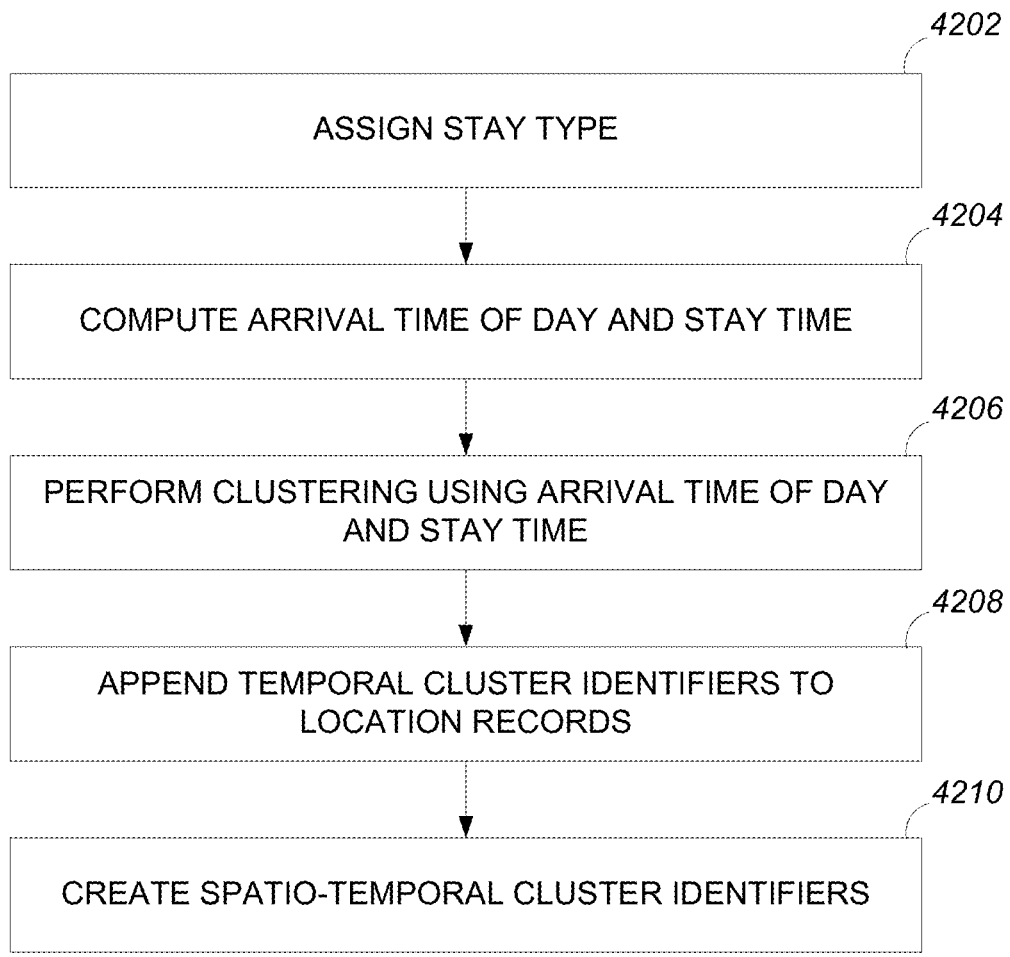
FIG. 6 is a flow chart diagram of performing density-based clustering in accordance with one implementation of the method of FIG. 4.
Figure 7:
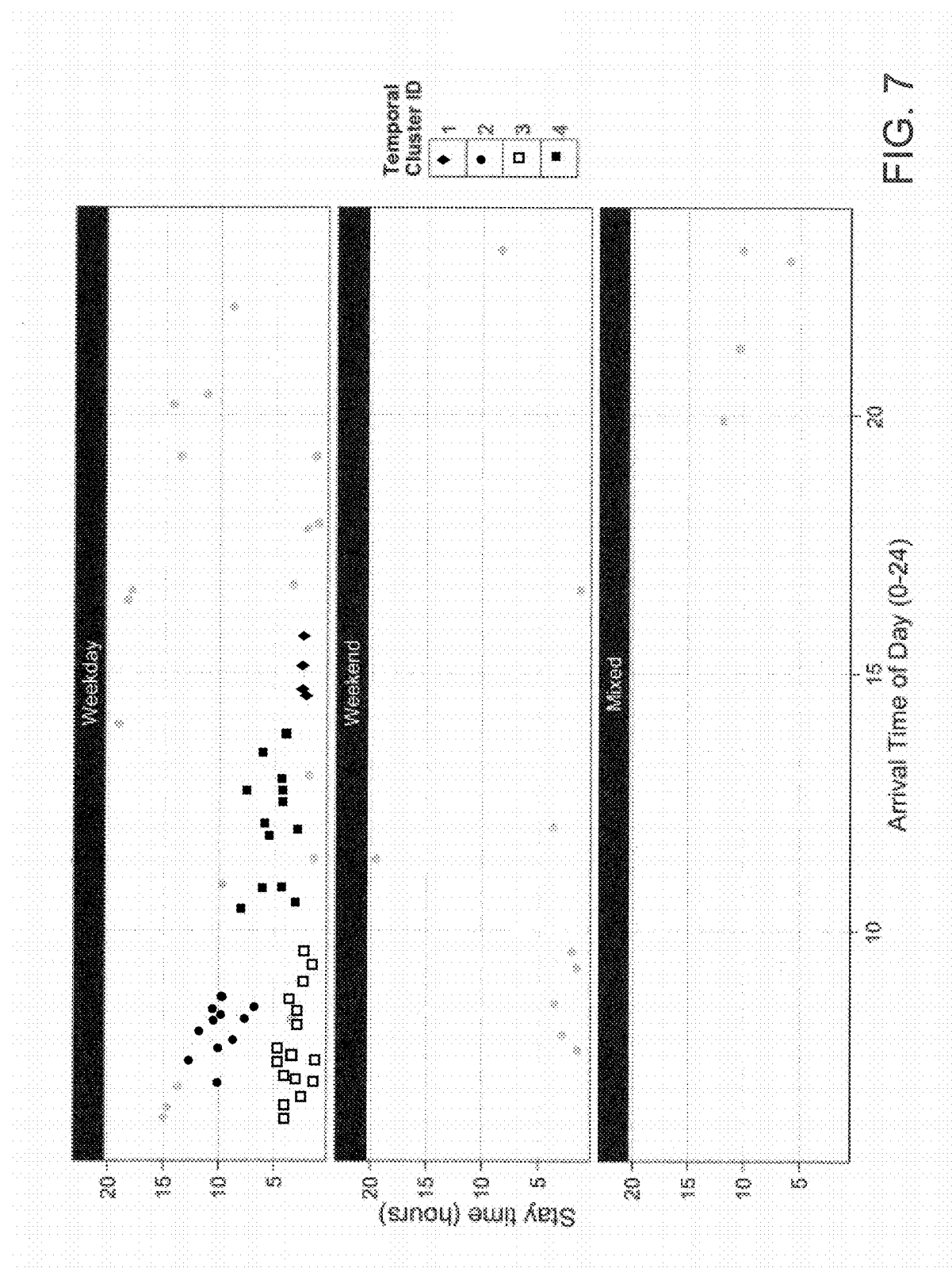
FIG. 7 is a graph of the results of performing two-dimensional density-based clustering used to explain FIG. 6.

FIG. 6 is a flow chart diagram of performing density-based clustering in accordance with one implementation of the method 4000 of FIG. 4. FIG. 7 is a graph of the results of performing two-dimensional density-based clustering used to explain FIG. 6.

Referring first to FIG. 6, assigning a stay type at 4202 may include grouping trip data associated with each destination of the at least some of the destinations by stay type. The stay type may be a weekday stay type having an arrival day of the week and a departure day of the week both falling on a weekday, a weekend stay type having an arrival day of the week and a departure day of the week both falling on a weekend, a mixed stay type having an arrival day of the week falling on a weekday and a departure day of the week falling on a weekend or having an arrival day of the week falling on a weekend and a departure day of the week falling on a weekday, or a combination of two or more of these categories. Grouping trip data associated with each destination of the at least some of the destinations by stay type may include using the location records of the location summary. In this case, the arrival and departure timestamps added at 4118 may include the arrival and departure days of the week for each location record.

Computing the arrival time of day at 4204 may include processing the arrival timestamp into a time of day value for each location record. This can be achieved by according to the formula (arrival time of day)=(hour of the arrival timestamp)+(minute of the arrival timestamp)/60. Computing the stay time at 4204 similarly relies upon the location records and is calculated as the difference of the arrival timestamp from the departure timestamp in number of hours in one implementation. In other implementations, minutes can be considered. However, this increases computational time.

After processing at 4204, trip data is partitioned by location (destination) and stay type. At 4206, clustering using the arrival time of day and the stay time is performed. This can be, for example, a two-dimensional density-based clustering. FIG. 7 is a graph of the results of performing two-dimensional density-based clustering used to explain FIG. 6.

FIG. 7 illustrates the arrival time of day and the stay time for location records generated over a one-month period for a single destination (i.e., a single spatial cluster). By example, this is a work location, but the processing is the same for other unique vehicle transportation network locations defining destinations for a vehicle operator. As can be seen in FIG. 7, the trip data is partitioned by stay type into weekday, weekend and mixed stays. Clustering is performed in the two-dimensional space defined by the arrival time of day on the x-axis and stay time of the y-axis. Density clusters may be identified within this two-dimensional space for each destination and stay type partition using a density-based clustering algorithm, such as density-based spatial clustering of applications with noise (DBSCAN). Other density-based clustering algorithms may be used.

The result of temporal clustering is one or more temporal clusters. FIG. 7 shows four temporal clusters. A temporal identifier (ID) is assigned to each of the points forming a temporal cluster. As can be seen, each of the temporal clusters is associated with a weekday arrival and departure. The remaining stay types had insufficiently dense data points to form any temporal clusters.

Referring again to FIG. 6, appending the temporal cluster identifiers to the location records occurs at 4208. This can involve updating the location records within the location summary described with reference to FIG. 5 by appending the temporal cluster identifiers back to the respective location records generating the points forming the clusters. Creating spatio-temporal cluster identifiers at 4210 includes assigning a unique numeric or alphanumeric identifier to valid temporal clusters. For example, one spatio-temporal cluster identifier could be assigned to each of the points forming temporal clusters 1-4 in FIG. 7 because they all fall in the same stay type and are directed to the same destination. More than one spatio-temporal cluster identifier may be assigned to temporal clusters for a single destination based on the stay type. Similarly, more than one spatio-temporal cluster identifier may be assigned to temporal clusters for the same stay type based on the destinations.

Clusters within the arrival time of day versus stay time space represent regularly repeating travel/stay patterns. Locations that are significant to the operation are generally visited regularly with similar arrival/departure times and a similar stay period. The at least two spatio-temporal clusters data formed by performing the density-based clustering at 4200 in FIG. 4 are thus used to assign a contextual label to a location at 4300. Assigning the contextual label at 4300 can include assigning a contextual label to a location associated with a first spatio-temporal cluster of the at least two spatial-temporal clusters based on the temporal data associated with the first spatio-temporal cluster, the location being a labeled location.

Figure 8:
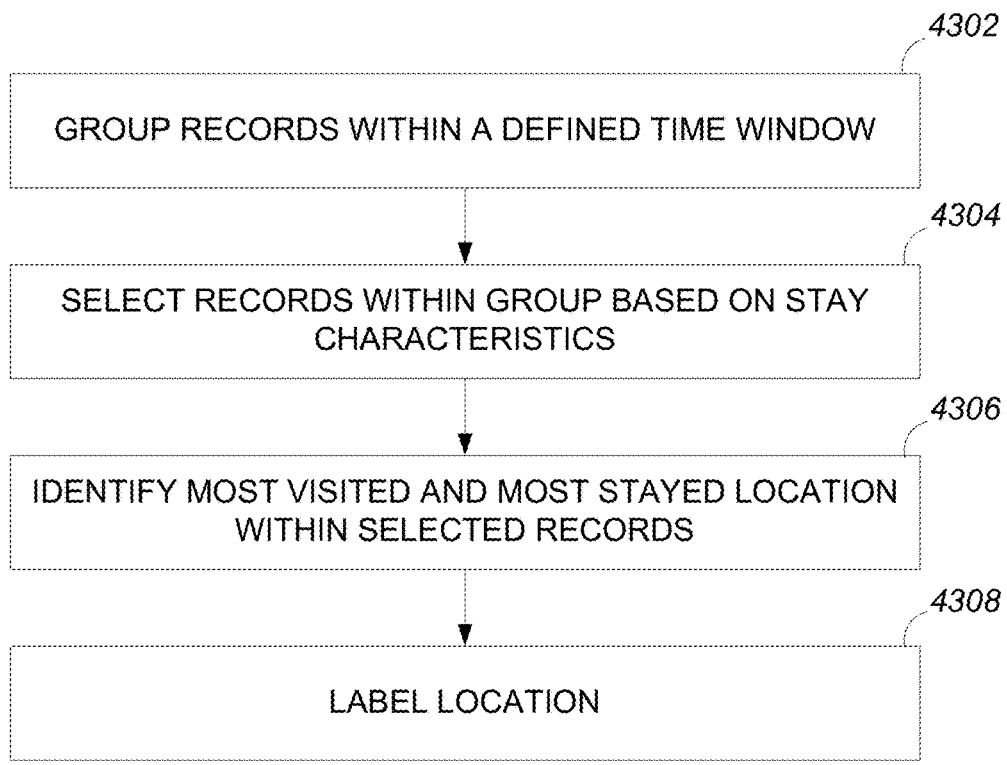
FIG. 8 is a flow chart diagram of assigning a contextual label to a location in accordance with one implementation of the method of FIG. 4.

FIG. 8 is a flow chart diagram of assigning a contextual label to a location in accordance with one implementation of the method 4000 of FIG. 4. FIG. 8 can be used to implement operation 4300 of FIG. 4. At 4302, records within a defined time window are grouped. For example, grouping the records can include selecting the records with valid temporal clusters (e.g., those given a spatio-temporal cluster identifier), and grouping those occurring within a defined time window such as one month. Records forming one or more spatio-temporal clusters may thus be considered.

From this group of records, selecting the records based on stay characteristics occurs at 4304. For example, when attempting to identify home as the location significant to a person associated with the vehicle, only records with an overnight stay may be selected at 4304. Alternatively, when attempting to identify work as the location significant to a person associated with the vehicle, only records with no overnight stay may be selected at 4304.

After the records are selected at 4304, identifying the most visited and most stayed location within the selected records occurs at 4306. The most visited destination may be the most frequently occurring destination within the selected records. The most stayed destination (i.e., unique vehicle transportation network location) may be the destination within the selected records having the longest combined stay time. In many cases, the most visited and most stayed location is a single destination that satisfies both of these conditions. However, the most stayed destination may not be the same destination as the most stayed destination. For this reason, a weighting may occur for the number of visits and combined stay time for each of the destinations occurring within the selected records to determine the most visited and most stayed location from the various destinations. The particular weighting technique is not critical as long it is used consistently so the relative values for each destination can be compared on the same scale.

However the location is selected from the destinations, it is labeled at 4308. Simple contextual labels such as "work", "home" or "other" may be used. For example, the most visited, most stayed location of the overnight stay records may be labeled as "home", while the most visited, most stayed location of the non-overnight stay records may be labeled as "work." The labeled locations may then be written to a database.

Returning again to FIG. 4, the labeled location may be used for vehicle operation at 4400. A vehicle operation device may be configured to operate the vehicle using the labeled location. This is described in more detail with respect to FIGS. 9 and 10.

Figure 9:
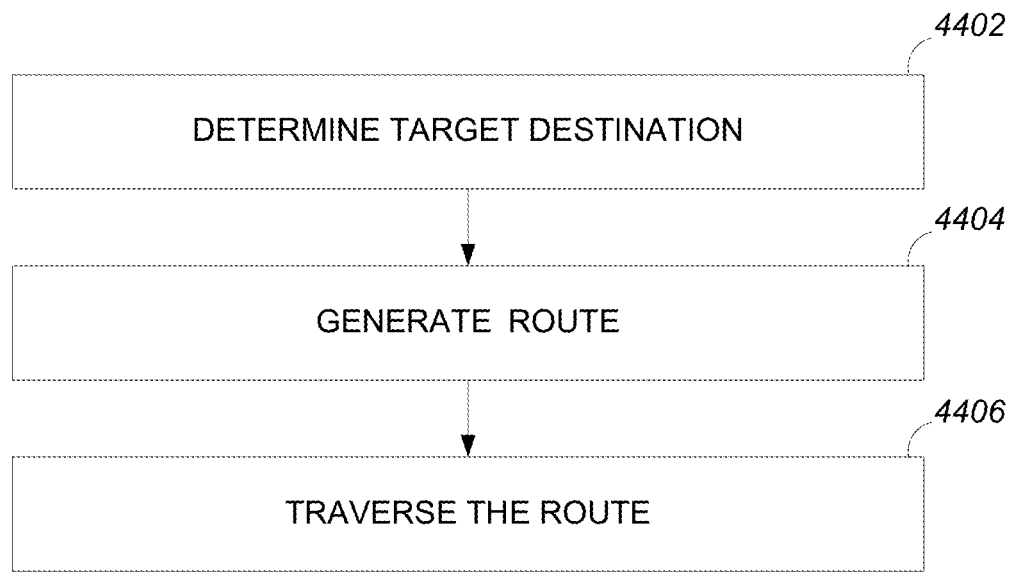
FIG. 9 is a flow chart diagram of using the labeled location for vehicle operation in accordance with one implementation of the method of FIG. 4.

FIG. 9 is a flow chart diagram of using the labeled location for vehicle operation in accordance with one implementation of the method 4000 of FIG. 4. The vehicle operation device may thus be a vehicle routing and navigation system in this implementation. FIG. 9 assumes that vehicle transportation network information, such as that illustrated in FIG. 3, has already been retrieved or generated as previously discussed. A target destination from within the vehicle transportation network information is identified at 4402. Identifying a destination may include identifying a point of interest, such as the building 3100 shown in FIG. 3 as a destination. In this implementation, the point of interest, and hence the target destination is a labeled location according to the assignment of 4300.

A route is identified or generated at 4402. In some embodiments, generating the route may include identifying an origin, which can also be a labeled location. Generally, the origin indicates a target starting point, such as a current location of the vehicle. In some embodiments, identifying the origin includes controlling a location unit, such as the location unit 1310 shown in FIG. 1, to determine a current geographic location of the vehicle. Identifying the origin at 5300 may also include identifying vehicle transportation network information corresponding to the origin. For example, identifying the origin may include identifying a road, road segment, lane, waypoint, or a combination thereof. Where the current location of the vehicle is a navigable non-road area or an area that is not expressly or completely included in a vehicle transportation network, such as an off-road area, identifying the origin may include identifying a road, road segment, lane, waypoint, or a combination thereof, near, or proximal to, the current location of the vehicle. Generating the route may include determining a route from the origin to the target destination identified at 4402, or generating a route from the origin to a short-term stopping point associated with the target destination, and generating a route from the short-term stopping point to the target destination identified at 4402. For simplicity and clarity, the description herein refers to routing and navigation between an origin and a target destination; however, routing and navigation may include routing and navigation between the origin and more than one point between the origin and the target destination and routing and navigation between one of these points and the target destination.

In some embodiments, generating the route may include generating candidate routes from the origin to the target destination. A candidate route may represent a unique or distinct route from the origin to the target destination. For example, a candidate route may include a unique or distinct combination of roads, road segments, lanes, waypoints and interchanges.

Generating the route may include identifying one or more routing states, each routing state corresponding to each waypoint in a candidate route, for each of the candidate routes. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, generating the route may include evaluating the expected action costs for performing an action, such as transitioning from one routing state to another, which may correspond with transitioning from one waypoint to another, and may represent the expected cost of the vehicle traveling from one location, represented by the first waypoint, to another location, represented by the second waypoint, during execution of the route. An action indicates a transition from a routing state to an immediately adjacent routing state, which may correspond with transitioning from a waypoint to an immediately adjacent waypoint without intersecting another waypoint, and may represent a vehicle traveling from a location, represented by the first waypoint, to another location, represented by the immediately adjacent waypoint.

An action cost may be determined based on the vehicle transportation network information. For example, within a candidate route, a first routing state may correspond with a first waypoint, which may correspond with a first location in the vehicle transportation network, a second routing state may correspond with a second waypoint, which may correspond with second location in the vehicle transportation network, and the action cost may represent an estimated, predicted or expected cost for the vehicle to travel from the first location to the second location. In some embodiments, action costs may be context dependent. For example, the action cost for transitioning between two waypoints at one time of day may be significant higher than the action costs for transitioning between the waypoints at another time of day.

Probability distributions may be generated as part of the process of generating the route. In some embodiments, generating the probability distributions includes generating a probable cost distribution for performing an action, such as transitioning from one routing state to another. Generating a probably cost distribution may include determining a probability of successfully performing an action, the probability of failing to perform the action, determining multiple possible costs for performing the action, determining probable costs associating probabilities with possible costs, or a combination thereof.

In some embodiments, generating a probability distribution may include using a normal, or Gaussian, distribution, N(μ, σ), where μ indicates the mean of the normal distribution, and σ indicates the standard deviation. The mean of the normal distribution and the standard deviation may vary from one action to another. The standard deviation may be augmented based on an action cost uncertainty variance modifier, which represents variation in the uncertainty of action costs.

Generating a probability distribution may also include generating discrete cost probability combinations for an action. For example, for an action in a route, generating a probability distribution may include generating a first probable cost as a combination of a first action cost, such as 45, and a first probability, such as 0.05, and generating a second probable cost as a combination of a second action cost, such as 50, and a second probability, such as 0.08.

Using a linear model of resources and costs is possible in generating a probability distribution. For example, the probability distribution for the travel time associated with an action may be represented by piece-wise constant functions, and the costs for performing an action may be represented by piece-wise linear functions.

In some embodiments, determining the action cost includes evaluating cost metrics, such as a distance cost metric, a duration cost metric, a fuel cost metric, an acceptability cost metric, or a combination thereof. In some embodiments, the cost metrics may be determined dynamically or may be generated, stored and accessed from memory, such as in a database. A cost function may be based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. An acceptability factor indicates that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics includes weighting the cost metrics and calculating the action cost based on the weighted cost metrics. Weighting a cost metric includes identifying a weighting factor associated with the cost metric. For example, identifying a weighting factor may include accessing a record indicating the weighting factor and an association between the weighting factor and the cost metric. In this case, weighting a cost metric may include generating a weighted cost metric based on the weighting factor and the cost metric. For example, a weighted cost metric can be a product of the weighting factor and the cost metric. In some embodiments, estimating the action cost may include calculating a sum of cost metrics, or a sum of weighted cost metrics.

Generating the route may identify an optimal route by selecting a candidate route from the candidate routes based on the probability distributions. For example, a candidate route having a minimal probable route cost may be identified as the optimal route. In some embodiments, the optimal route may be identified using a constant time stochastic control process, such as a hybrid Markov decision process.

Identifying the optimal route may include selecting the minimum probable action cost from among an action cost probability distribution for transitioning from a first routing state to a second routing state and an action cost probability distribution for transitioning from the first routing state to a third routing state. Identifying the optimal route may also include generating a route cost probability distribution for a candidate route based on the action cost probability distributions for each action in the route. Generating a route cost probability distribution for each candidate route and selecting the candidate route with the lowest, or minimum, probable route cost as the optimal route is also possible.

The controller of the vehicle may output or store the candidate routes, the optimal route, or both. For example, the controller may store the candidate routes and the optimal route and may output the optimal route to a trajectory controller, vehicle actuator, or a combination thereof, to operate the vehicle to travel from the origin to the target destination (i.e., the labeled location).

The vehicle traverses the route (e.g., the optimal route) by traveling from the origin to the target destination at 4406. For example, an autonomous vehicle may include a vehicle actuator, such as the actuator 1240 shown in FIG. 1, and the vehicle actuator may operate the autonomous vehicle to begin traveling from the origin to the target destination using the optimal route. In some embodiments, the vehicle may include a trajectory controller and the trajectory controller may operate the vehicle to begin travelling based on the optimal route and current operating characteristics of the vehicle, and the physical environment surrounding the vehicle.

The route may be updated while traveling. In some embodiments, updating the optimal route may include updating or regenerating the candidate routes and probability distributions, and identifying the updated route from the updated or regenerated candidate routes and probability distributions. The route may need to be updated due to updated vehicle transportation network information, differences between actual travel costs and the probable costs of the selected route, or a combination of these factors.

In this way, the labeled location may be used for vehicle operation.

Figure 10:
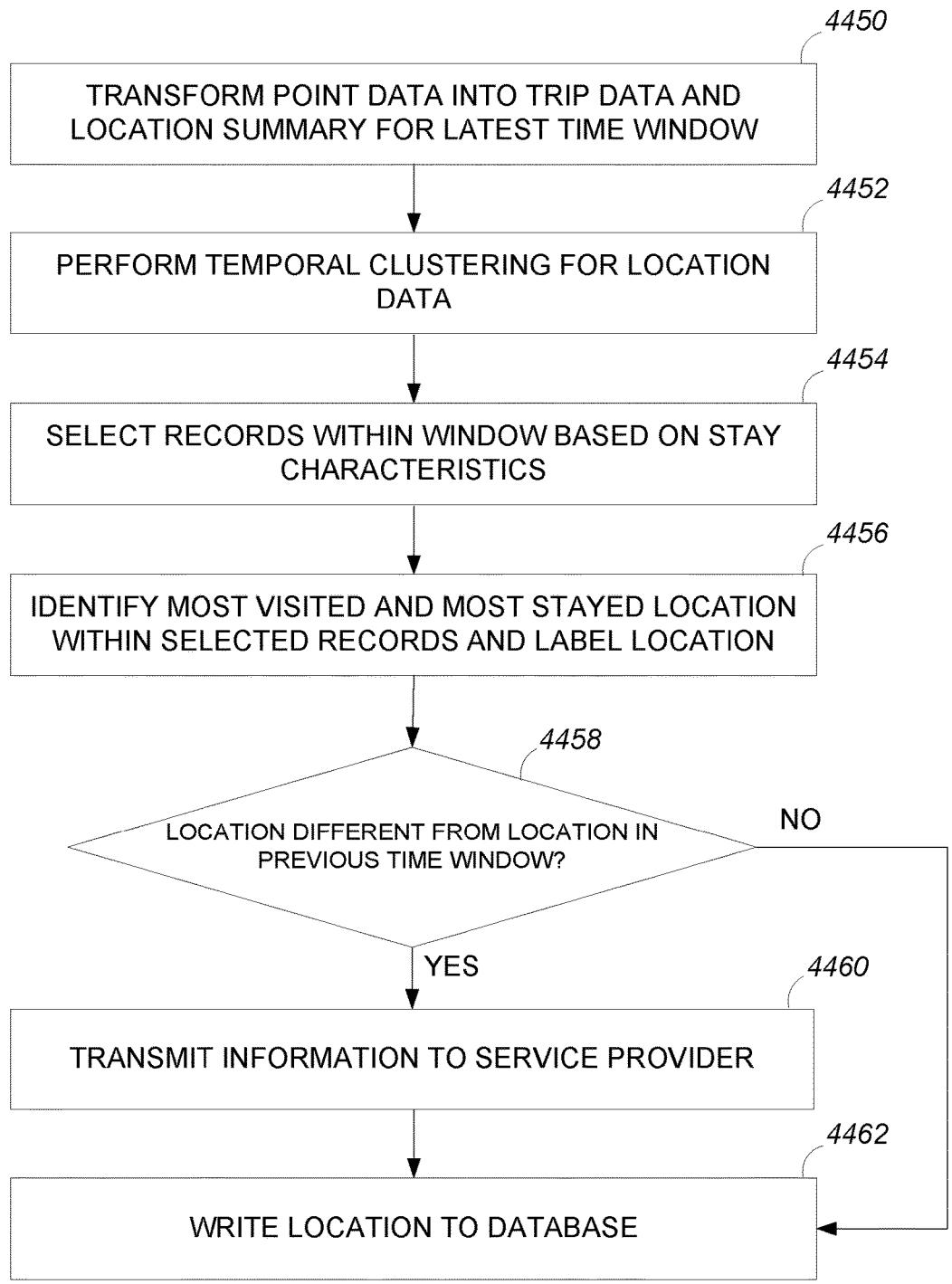
FIG. 10 is a flow chart diagram of using the labeled location for vehicle operation in accordance with another implementation of the method of FIG. 4.

The labeled location may also be used for vehicle operation by notifying an appropriate service provider of a change in an identity of the labeled location. That is, by continuously tracking at least some significant locations of an operator of a vehicle in a moving window, it is possible to identify a change in, for example, a home location in an automated manner with a reasonable degree of confidence. In this case, the vehicle can be identified for further action, such as for contact with the operator for vehicle service, etc. FIG. 10 describes a location change analysis that can make such a notification using the labeled location. The vehicle operation device may thus be a vehicle communication system.

More generally, FIG. 10 is a flow chart diagram of using the labeled location for vehicle operation in accordance with another implementation of the method 4000 of FIG. 4. At 4450, point data is transformed into trip data and a location summary for the latest time window. This can correspond to the processing described with respect to FIG. 5 for the probe data received for the latest time window. For example, the latest time window can be a second month when the processing was previously performed for a first month. The vehicle probe data can also overlap time windows. In other words, the vehicle probe data can be added to previously processed vehicle probe data while dropping the oldest corresponding vehicle probe data so as to form a moving time window for the processing. Performing temporal clustering for the location data at 4452 can be done in a like manner as described with respect to the density-based clustering of FIG. 6.

At 4456, the most visited, most stayed location within the selected records is identified and labeled. The processing at 4456 can be done in a like manner as described with respect to FIG. 8. If the location is different from the location in the previous time window at 4458, the information is transmitted at 4460. For example, if the home location has different coordinates from the previous home location, processing would advance to 4460. In this implementation, the information is transmitted at 4460 is transmitted to a service provider for operation of the vehicle. The information may also be written to a database at 4462 whether or not a location significant to the person associated with the vehicle has changed. The database can maintain the current identifications of such locations for use in navigation and for comparison with the results of a subsequent location change analysis. The location change analysis can be performed periodically or on demand, for example.

The above-described aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A vehicle, comprising:
a processor configured to execute instructions stored on a non-transitory computer readable medium to:
identify vehicle transportation network information representing a vehicle transportation network, the vehicle transportation network information including destinations of a vehicle obtained by spatially clustering vehicle probe data;
for at least some of the destinations, perform density-based clustering using temporal data associated with the at least some of the destinations to form at least two spatio-temporal clusters; and
assign a contextual label to a location associated with a first spatio-temporal cluster of the at least two spatio-temporal clusters based on the temporal data associated with the first spatio-temporal cluster, the location being a labeled location; and
a vehicle operation device configured to operate the vehicle using the labeled location.

2. The vehicle of claim 1, wherein the processor is configured to execute instructions stored on the non-transitory computer readable medium to perform density-based clustering by:
performing two-dimensional density-based clustering using an arrival time of day and a stay time of trip data associated with the at least some of the destinations.

3. The vehicle of claim 2, wherein the processor is configured to execute instructions stored on the non-transitory computer readable medium to perform density-based clustering by:
grouping trip data associated with each destination of the at least some of the destinations by stay type; and
performing the two-dimensional density-based clustering by the stay type.

4. The vehicle of claim 3, wherein the stay type comprises at least two of:
a weekday stay type having an arrival day of a week and a departure day of the week both falling on a weekday;
a weekend stay type having an arrival day of the week and a departure day of the week both falling on a weekend; or
a mixed stay type having an arrival day of the week falling on a weekday and a departure day of the week falling on a weekend or having an arrival day of the week falling on a weekend and a departure day of the week falling on a weekday.

5. The vehicle of claim 1, wherein the processor is configured to execute instructions stored on the non-transitory computer readable medium to identify vehicle transportation network information representing a vehicle transportation network by, before the density-based clustering:
transforming point data from the vehicle probe data into trip data, each trip forming the trip data comprising a start point with a start timestamp and a stop point with a stop timestamp; and
performing the spatial clustering using the trip data to form spatial clusters to identify the destinations of the vehicle.

6. The vehicle of claim 5, wherein the processor is configured to execute instructions stored on the non-transitory computer readable medium to identify vehicle transportation network information representing a vehicle transportation network by, before the density-based clustering:
storing the trip data to form stored trip data;
assigning a cluster identifier to each unique vehicle transportation network location resulting from performing the spatial clustering; and
appending the cluster identifier to any of the start points and any of the stop points forming a respective one of the spatial clusters within the stored trip data.

7. The vehicle of claim 6, wherein the processor is configured to execute instructions stored on the non-transitory computer readable medium to identify vehicle transportation network information representing a vehicle transportation network by, before the density-based clustering:

determining a stay time for a trip of the trip data as a difference between a stop timestamp of the trip and a start timestamp of a subsequent trip;

filtering continuous records by comparing a cluster identifier of the trip with a cluster identifier of the subsequent trip to generate a location record for the unique vehicle transportation network location; and adding an arrival timestamp at the unique vehicle transportation network location and a departure timestamp from the unique vehicle transportation network location to the location record.

8. The vehicle of claim 5, wherein the processor is configured to execute instructions stored on the non-transitory computer readable medium to identify vehicle transportation network information representing a vehicle transportation network by, before the density-based clustering:

sorting each entry within the vehicle probe data based on a measurement timestamp to form a sequence of records;

determining a time difference of consecutive records within the sequence;

identifying the start of a trip when the time difference exceeds a threshold value; and identifying the start point, the start timestamp, the stop point, and the stop timestamp for the trip.

9. The vehicle of claim 1, wherein the processor is configured to execute instructions stored on the non-transitory computer readable medium to identify vehicle transportation network information representing a vehicle transportation network by, before the density-based clustering:

performing the spatially clustering using a plurality of trips comprising GPS coordinates associated with each of a start location and an end location from the vehicle probe data to form spatial clusters; and assigning a cluster identifier to each location associated with a spatial cluster; and wherein the processor is configured to execute instructions stored on the non-transitory computer readable medium to perform density-based clustering by:

for each location assigned to a cluster identifier, performing two-dimensional density-based clustering of arrival time of day at location versus a stay time at the location to form temporal clusters; and forming the at least two spatio-temporal clusters by combining the spatial clusters with the temporal clusters.

10. The vehicle of claim 1, wherein the processor is configured to execute instructions stored on the non-transitory computer readable medium to assign a contextual label to a location by:

selecting records from the first spatio-temporal cluster within a defined time window that have an overnight stay;

identifying the location that is the most common within the records; and assigning the contextual label of home to the location.

11. The vehicle of claim 1, wherein the processor is configured to execute instructions stored on the non-transitory computer readable medium to assign a contextual label to a location by:

selecting records from the first spatio-temporal cluster within a defined time window that have no overnight stay;

identifying the location that is the most common within the records; and assigning the contextual label of work to the location.

12. The vehicle of claim 1, wherein the vehicle operation device is a navigation system; and wherein the processor is configured to execute instructions stored on the non-transitory computer readable medium to:

generate a route to the labeled location using the navigation system.

13. The vehicle of claim 12, wherein the vehicle is an autonomous vehicle; and wherein the processor is configured to execute instructions stored on the non-transitory computer readable medium to:

operate the vehicle to traverse the route.

14. A system for identifying and using a location significant to a person associated with a vehicle based on vehicle probe data, the system including:

a memory including a non-transitory computer readable medium; and a processor configured to execute instructions stored on the non-transitory computer readable medium to:

identify vehicle transportation network information representing a vehicle transportation network, the vehicle transportation network information including destinations of a vehicle obtained by spatially clustering vehicle probe data;

for at least some of the destinations, perform density-based clustering using temporal data associated with the at least some of the destinations to form at least two spatio-temporal clusters;

assign a contextual label to a location associated with a first spatio-temporal cluster of the at least two spatio-temporal clusters based on the temporal data associated with the first spatio-temporal cluster, the location being a labeled location; and use the labeled location for vehicle operation.

15. The system of claim 14, wherein the processor is configured to execute instructions stored on the non-transitory computer readable medium to use the labeled location for vehicle operation by:

performing density-based clustering using temporal data associated with destinations determined over a period of time subsequent to the assigning the contextual label to form at least two updated spatio-temporal clusters;

assigning the contextual label to an updated location associated with a first updated spatio-temporal cluster;

comparing the location with the updated location; and changing the labeled location to the updated location when the updated location is different from the location.

16. The system of claim 14, wherein the processor is configured to execute instructions stored on the non-transitory computer readable medium to perform density-based clustering using temporal data by:

performing two-dimensional density-based clustering using an arrival time of day and a stay time of trip data associated with those of the destinations having a same stay type based on an arrival day of a week and a departure day of the week.

17. The system of claim 16, wherein the processor is configured to execute instructions stored on the non-transitory computer readable medium to identify vehicle transportation network information by, before the density-based clustering:

performing the spatially clustering using location data within the vehicle probe data to identify the destinations.

18. A system for identifying and using a location significant to a person associated with a vehicle based on vehicle probe data, the system including:
- a memory including a non-transitory computer readable medium; and
- a processor configured to execute instructions stored on the non-transitory computer readable medium to:
  - identify vehicle transportation network information representing a vehicle transportation network by performing spatial clustering of vehicle location information obtained from vehicle probe data of a vehicle, the vehicle transportation network information including destinations of the vehicle;
  - perform two-dimensional density-based clustering using an arrival time of day and a stay time associated with at least some of the destinations to form a spatio-temporal cluster;
  - assign a contextual label to a location associated with the spatio-temporal cluster based on temporal data associated with the spatio-temporal cluster, the location being a labeled location; and
  - use the labeled location for vehicle operation.

19. The system of claim 18, wherein the processor is configured to execute instructions stored on the non-transitory computer readable medium to:
- group trip data associated with the destinations by stay type; and wherein the processor is configured to execute instructions stored on the non-transitory computer readable medium to perform two-dimensional density-based clustering by:
- performing the two-dimensional density-based clustering for the at least some of the destinations associated with a single stay type.

20. The system of claim 19, wherein the single stay type comprises one of:
- a weekday stay type having an arrival day of a week and a departure day of the week both falling on a weekday; or
- a weekend stay type having an arrival day of the week and a departure day of the week both falling on a weekend.

* * * * *